United States Patent [19]

Seto et al.

[11] 4,350,433

[45] Sep. 21, 1982

[54] SCANNING ILLUMINATOR

[75] Inventors: Susumu Seto, Odawara; Mitsuhiro Tokuhara, Chigasaki; Yukio Takemura, Kawasaki; Yu Yamada, Kokubunji; Takeshi Kuwayama, Yokohama, all of Japan

[73] Assignee: Canon Kabushiki Kaisha, Tokyo, Japan

[21] Appl. No.: 281,880

[22] Filed: Jul. 9, 1981

[30] Foreign Application Priority Data

Jul. 24, 1980 [JP] Japan .............................. 55-101505

[51] Int. Cl.³ ............................................ G03G 15/28
[52] U.S. Cl. ........................................ 355/8; 355/1;
 355/11; 355/66; 355/70; 362/32; 362/346
[58] Field of Search ...................... 355/1, 8, 11, 66, 67, 355/70; 350/96.25; 362/3, 32, 346

[56] References Cited

U.S. PATENT DOCUMENTS

| | | | |
|---|---|---|---|
| 3,586,849 | 6/1971 | Starkweather | 355/70 X |
| 3,669,538 | 6/1972 | Fowler | 355/67 |
| 4,154,500 | 5/1979 | Funato et al. | 362/32 X |
| 4,232,964 | 11/1980 | Nodov et al. | 355/8 X |
| 4,259,711 | 3/1981 | Mochizuki | 362/346 X |

Primary Examiner—Richard L. Moses
Attorney, Agent, or Firm—Fitzpatrick, Cella, Harper & Scinto

[57] ABSTRACT

A scanning illuminator suitable for use in high speed copying machines is adapted to compensate the distribution of loss in light quantity with respect to an imaging lens due to the so-called Cos⁴ law in the scanning direction and includes fixed sources of light. The scanning illuminator is characterized by illuminating systems disposed symmetrically relative to an original supporting area, each illuminating system being adapted for illuminating the opposite end areas of an original by a portion of light beam from the fixed source of light adjacent one end of the original, especially the light beam portion emitted and bled backward of the light source, the illuminating system having at least one rotating or translating scan mirror for scanning the illuminating light beam.

6 Claims, 6 Drawing Figures

SCANNING ILLUMINATOR

BACKGROUND OF THE INVENTION

1. Field of the Invention

This invention relates to a scanning illuminator suitable for use in high speed copying machines, said scanning illuminator being adapted to provide a distribution of illumination for compensating a distribution of loss in light quantity due to the so-called $Cos^4$ law of lenses on the surface of an original, and including fixed sources of light.

2. Description of the Prior Art

In the prior art, it is known that when an original uniformly illuminated is projected onto a photoreceptor through a lens system, the original is subjected to underexposure at its opposite ends in comparison with its central portion under the influence of a loss in light quantity due to the $Cos^4$ law in the lens system. In order to overcome this problem, the prior art slit-exposure scan type copying machines comprise, for example, a rod-like light source having a filament longer at its opposite ends than its central portion in a direction perpendicular to the scanning direction so that the luminance distribution will be maintained. On the other hand, there is not compensated any loss in light quantity particularly due to the $Cos^4$ law in the scanning direction. It is desirable that the photoreceptor can be subjected to uniform exposure both in the scanning direction and the direction perpendicular thereto. Most scanning illumination systems in the prior art slit-exposure type copying machines include a scanning mirror followed by a source of light. However, the moving light source has a problem in durability since it is accompanied by electric cords or the like, and is especially unsuitable for high speed copying machines.

SUMMARY OF THE INVENTION

It is an object of this invention to provide a scanning illuminator suitable for use in high speed copying machines, which can compensate any loss in light quantity due to the $Cos^4$ law in the scanning direction and includes fixed sources of light.

This object can be accomplished by providing a scanning illuminator which comprises fixed sources of light adjacent to the opposite ends of an original, reflectors partially surrounding the respective sources of light and at least two scanning mirrors for scanning the light beams from the respective light sources on the surface of original in a slit-exposure manner and which is characterized by that each of the reflectors includes an opening formed therein behind the associated light source and that the illuminating light beam passed through the opening is transmitted to the associated end area in the surface of the original by means of a light transmitting member.

DESCRIPTION OF THE PREFERRED EMBODIMENTS

Figure 1:
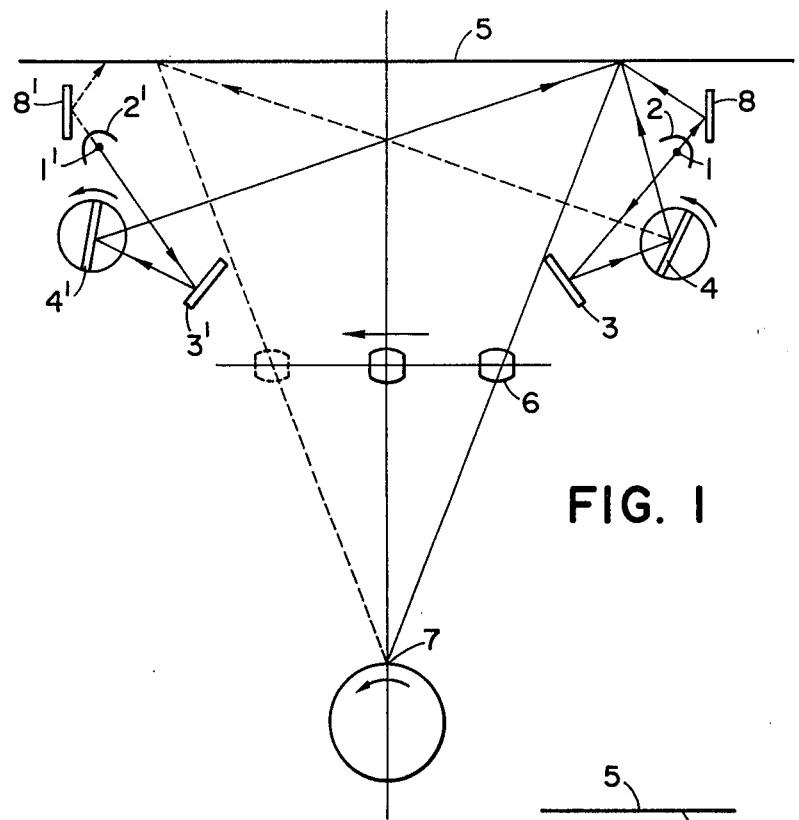
FIG. 1 is a view of one embodiment according to this invention.

FIG. 1 shows the first embodiment of this invention. The first embodiment comprises two scanning illumination systems arranged in a symmetrical fashion. In one scanning illumination system, a beam of light emitted from a rod-like fixed source of light 1 is reflected by a convergent reflector 2 having a cross-section represented by a curve of secondary degree toward a fixed mirror 3 or transmitted directly to the fixed mirror 3 whereat it is again reflected to a rotary mirror 4 by which the reflected light beam is scanned on the surface of an original 5 in a slit-exposure manner from right-hand to left-hand as viewed in FIG. 1. The slit-shaped area on the original 5 is projected in a slit shape onto a photoreceptor 7 rotated in an arrow direction, through a projection lens 6.

The slit-shaped area on the original 5 also is illuminated by means of another scanning illumination system disposed symmetrically relative to the one scanning illumination system adjacent to the opposite end of the original. That is to say, a beam of light emitted from another fixed source of light 1' is reflected by a reflector 2' toward a fixed mirror 3' or transmitted directly to the fixed mirror 3' whereat the light beam is again reflected to a rotary mirror 4' by which it is scanned on the surface of the original 5 in a slit-exposure manner. The rotary mirrors 4 and 4' are rotated in the same direction in synchronization with the rotation of the photoreceptor 7. Correspondingly, the lens 6 is moved an arrow direction parallel to the surface of the original 5 to project the whole area of the original onto the photoreceptor 7.

Behind each of the light sources 1 and 1' is respectively disposed an end covering mirror 8, 8' for illuminating the associated end area of the original to increase it in illumination.

Figure 2:
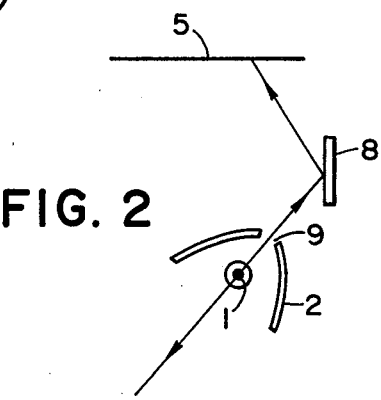
FIG. 2 is a fragmentary, enlarged view showing the portion of the first embodiment adjacent to one end of an original.

FIG. 2 is a fragmentary, enlarged view showing the arrangement adjacent to the end of the original. The reflector 2 includes an opening 9 formed therein behind the light source 1, through which a portion of the beam from the light source 1 is passed to the end covering mirror 8 whereat the beam portion is reflected to illuminate the associated end area of the original over a wide range. Such an illuminating is similarly obtained by another arrangement including the reflector 2' and the end covering mirror 2' which are located adjacent to the opposite end of the original 5. The light beam emitted rearward from the light source 1' illuminates the opposite end area of the original 5 over a wide range.

In general, a portion of the light beam emitted rearward from such a light source means as the light sources 1 and 1' tends to be intercepted by the tubular wall of the light source means after the light beam portion has been reflected by such a reflector means as the reflector 2 and 2', so that the illumination efficiency is decreased. According to this invention, it is possible to increase the illumination efficiency.

Figure 3:
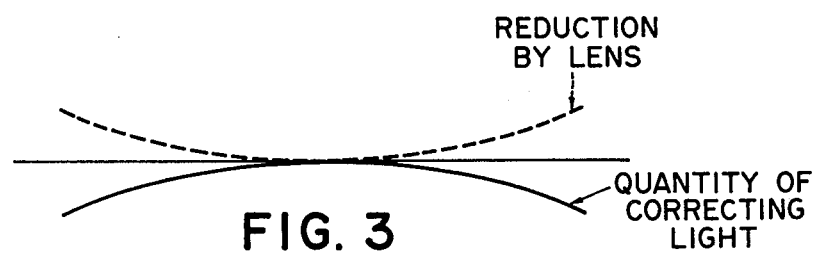
FIG. 3 is a graph illustrating a distribution of exposure.

The light beams reflected by the end covering mirrors 8 and 8' are increased in intensity as closer to the ends of the original. As can be seen from FIG. 3, therefore, the illuminating systems according to this invention provide a distribution of exposure for compensating any loss in light quantity due to the Cos⁴ law in the lenses. This means that copying can be accomplished with uniform density over the whole area of the original. FIG. 3 is a graph illustrating a distribution of exposure wherein the scanning direction is shown by the axis of abscissas and the exposure by the axis of ordinates.

Figure 4:
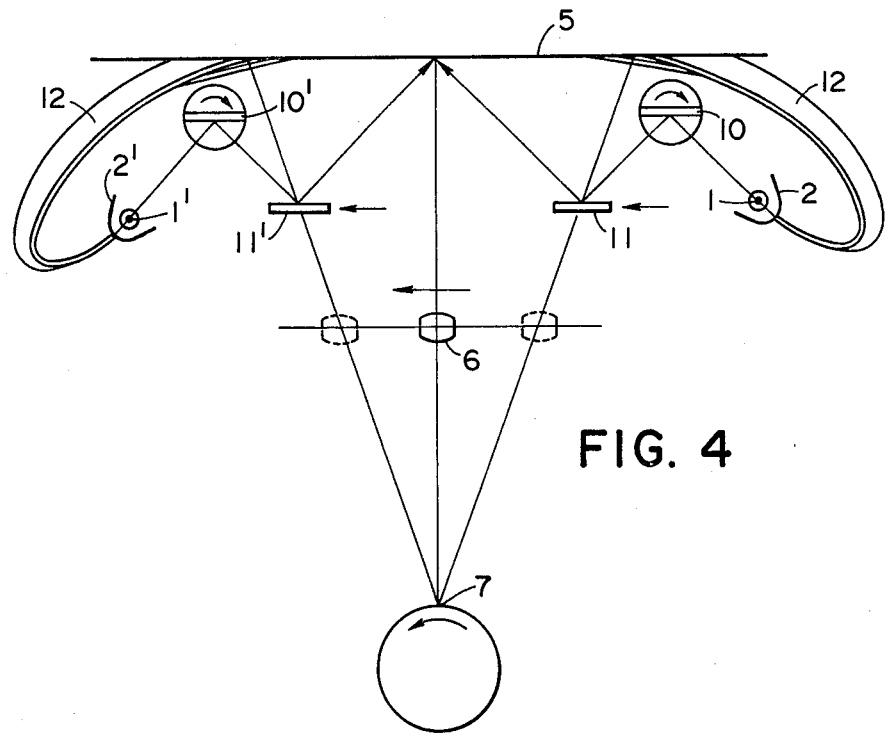
FIG. 4 is a view of the second embodiment according to this invention.

FIG. 4 shows the second embodiment of this invention. A light beam emitted from the light source 1 is reflected by the reflector 2 to a rotary mirror 10 or incident directly on the rotary mirror 10 whereat it is again reflected toward a scanning mirror 11. The scanning mirror 11 is moved in a direction parallel to the surface of the original 5 so that the latter will be scanned by the reflected and moved light beam from right-hand to left-hand as viewed in FIG. 4, in a slit-exposure manner.

The slit-shaped illuminated area on the original 5 is projected in a slit shape onto the rotating photoreceptor 7 through the projection lens 6 which is moved in a direction as shown by an arrow in FIG. 4.

The slit-shaped area on the original 5 is also illuminated by another scanning illumination system located symmetrically adjacent to the opposite end of the original. A light beam emitted from the fixed source of light 1' is reflected by the reflector 2' to a rotary mirror 10' or incident directly on the rotary mirror 2' whereat the beam is again reflected to a scanning mirror 11' moved parallel to the surface of the original 5. By means of the scanning mirror 11', the reflected light beam scans the surface of the original 5 in a slit shape together with the light beam from the light source 1.

In synchronization with the rotation of the photoreceptor 7, the rotary mirrors 10 and 10' are rotated and the scanning mirrors 11 and 11' are translated so that the whole area of the original will be projected onto the photoreceptor 7.

Behind each of the light sources 1 and 1' is provided a light guide 12 or 12' through which the light beam passed backward from the associated light source via an opening (not shown) in the associated reflector 2 or 2' illuminates the respective end area of the original to increase it in illumination.

Figure 5:
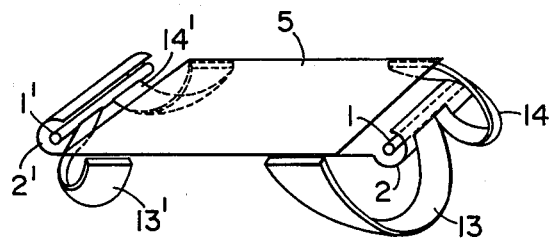
FIG. 5 is a view of the third embodiment according to this invention.

FIG. 5 shows the third embodiment of this invention. Although the first and second embodiments utilize the illumination systems for uniformly illuminating the opposite ends of the original in a slit shape along its longitudinal direction, the third embodiment shown in FIG. 5 comprises light guides 13, 14 and 13' and 14' each of which is adapted to illuminate one corner of the original.

Figure 6:
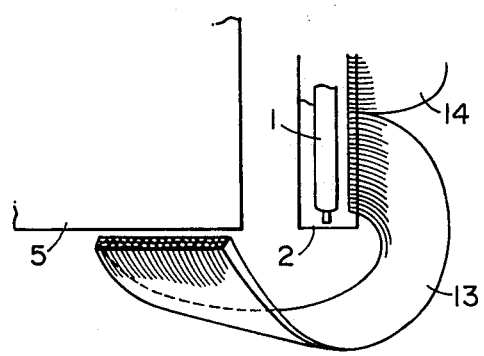
FIG. 6 is a fragmentary, enlarged view showing the portion of the third embodiment adjacent to one corner of the original.

FIG. 6 is a fragmentary, enlarged view showing the one corner of the original. Light emitted backward from the light source 1 passes through an opening (not shown) in the reflector 2 and is conducted by the light guides 13 and 14 to form light beams oriented in the scanning direction. These light beams illuminate only the associated corner of the original to increase it in illumination. Considering the illumination in the longitudinal direction of the slit, it is similarly increased at the opposite ends of the original. It is thus understood that there is formed a distribution of illumination for compensating any loss in light quantity due to the Cos⁴ law both in the longitudinal direction of the slit and the direction perpendicular thereto. In the light guides utilized in this invention, such a distribution of illumination that is increased as closer to the ends of the original can be obtained by controlling the illuminating surface area in the end face of the light guide, for example, by varying the number of the light transmitting fibers used in the light guide.

This invention is not limited to the illustrated embodiments and can be applied to any type of scanning illumination systems including fixed sources of light. For example, this invention can be applied to an overall exposure type illumination system different from the slit exposure type scanning illumination system. Especially, this invention is suitably applied to such an illumination system as includes light sources arranged both in the longitudinal direction of the slit and the scanning direction perpendicular thereto.

As be apparent from the foregoing, this invention provides a scanning illumination system suitable for use in high speed copying machines, in which a distribution of illumination for compensating any loss in light quantity due to the Cos⁴ law in lenses can be provided in the surface of an original to be copied and which includes fixed sources of light.

We claim:

1. A scanning illuminator comprising a first source of light fixed adjacent to one end of the surface of an original; a first reflector partially surrounding said first light source and including an opening formed therein behind said first light source; a first light transmitting member for transmitting the illuminating light beam passed through said opening onto the one end area of said original surface; at least one first scanning mirror for scanning the light beam from said first light source on the surface of said original in a slit shape; a second source of light fixed adjacent to the opposite end of said original surface; a second reflector partially surrounding said second light source and including an opening formed therein behind said second light source; a second light transmitting member for transmitting the illuminating light beam passed through said opening in said second reflector onto the opposite end area of said original surface; and a second scanning mirror for illuminating the surface of said original in a slit shape with the light beam from said second light source in such a manner that the slit-shaped area on the original surface illuminated by said first scanning mirror is superimposed by the light beam from said second light source.

2. A scanning illuminator as defined in claim 1 wherein each of said light transmitting members includes a fixed mirror located adjacent to the associated end of said original.

3. A scanning illuminator as defined in claim 1 wherein each of said light transmitting members includes a light guide fixed at a position adjacent to the associated end of said original.

4. A scanning illuminator as defined in claim 3 wherein four of said light guides are arranged to illuminate the respective corners of said original.

5. A copying machine comprising a fixed platen for originals; a movable photoreceptor; an imaging lens for imaging a slit-shaped area of an original on said photoreceptor in a slit shape, said imaging lens being moved parallel to the surface of said original; a first source of light fixed adjacent to one end of said original surface; a first reflector partially surrounding said first light source and including an opening formed therein behind said first light source; a first light transmitting member for transmitting the illuminating light beam passed through said opening to said one end of said original surface; at least one first scanning mirror for scanning said light beam from said first light source on the surface of said original in a slit shape; a second source of light fixed at a position adjacent to the opposite end of said original surface; a second reflector partially surrounding said second light source and including an opening formed therein behind said second light source; a second light transmitting member for transmitting the light beam passed through the opening in said second reflector onto the opposite end area of said original; and a second scanning mirror for illuminating the surface of said original with the light beam from said second light source in a slit shape in such a manner that the slit-shaped area of the original surface illuminated by said first scanning mirror is superimposed by the light beam from said second light source.

6. An illuminator comprising a first source of light fixed at a position adjacent to one end of an original for illuminating said original; a first reflector partially surrounding said first light source and including an opening formed therein behind said first light source; a first light transmitting member for transmitting the illuminating light beam passed through said opening to said one end area of said original; a second light source fixed at a position adjacent to the opposite end of said original for illuminating said original; a second reflector partially surrounding said second light source and including an opening formed therein behind said second light source; and a second light transmitting member for transmitting the light beam passed through said opening in said second reflector to said opposite end area of said original.

* * * * *